(12) United States Patent
Kim et al.

(10) Patent No.: US 10,569,772 B2
(45) Date of Patent: Feb. 25, 2020

(54) COGNITIVE BEHAVIOR PREDICTION SYSTEM FOR AUTONOMOUS SYSTEMS

(71) Applicant: HRL Laboratories, LLC, Malibu, CA (US)

(72) Inventors: Hyun (Tiffany) J. Kim, Irvine, CA (US); Christian Lebiere, Pittsburgh, PA (US); Jerry Vinokurov, New York, NY (US); Rajan Bhattacharyya, Sherman Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 138 days.

(21) Appl. No.: 15/947,236

(22) Filed: Apr. 6, 2018

(65) Prior Publication Data

US 2018/0297592 A1    Oct. 18, 2018

Related U.S. Application Data

(60) Provisional application No. 62/484,489, filed on Apr. 12, 2017.

(51) Int. Cl.
*B60W 30/095* (2012.01)
*G05D 1/00* (2006.01)
*G06K 9/00* (2006.01)

(52) U.S. Cl.
CPC ....... *B60W 30/0956* (2013.01); *G05D 1/0088* (2013.01); *G06K 9/00369* (2013.01); *G06K 9/00805* (2013.01); *G06K 9/00818* (2013.01); *G06K 9/00825* (2013.01); *G05D 2201/0213* (2013.01)

(58) Field of Classification Search
CPC .......... B60W 30/0956; G06K 9/00369; G06K 9/00805; G06K 9/00825; G06K 9/00818; G05D 1/0088; G05D 2201/0213
See application file for complete search history.

(56) References Cited

U.S. PATENT DOCUMENTS

| | | | |
|---|---|---|---|
| 7,599,902 B2 * | 10/2009 | Fox .......................... | G06N 5/04 706/54 |
| 8,346,391 B1 | 1/2013 | Anhalt et al. | |
| 8,655,537 B2 * | 2/2014 | Ferguson ................. | G05D 1/00 701/23 |

(Continued)

FOREIGN PATENT DOCUMENTS

WO    WO2015-072255 A1    5/2015

OTHER PUBLICATIONS

Salvucci, D.D. Modeling Driver Behavior in a Cognitive Architecture. Human Factors, vol. 48 No. 2, pp. 362-380, 2006.

(Continued)

*Primary Examiner* — Michael J Zanelli
(74) *Attorney, Agent, or Firm* — Tope-McKay & Associates

(57) ABSTRACT

Described is a system for predicting the behavior of an autonomous system. The system identifies a taxonomic state of a motion condition of an autonomous vehicle based on a spatiotemporal location of the autonomous vehicle and elements of a driving scenario. Behavior of the autonomous vehicle is predicted based on the taxonomic state of the motion condition. The autonomous vehicle makes and implements a driving operation decision based on the predicted behavior.

23 Claims, 9 Drawing Sheets

(56) References Cited

U.S. PATENT DOCUMENTS

| | | | | |
|---|---|---|---|---|
| 9,459,623 | B1* | 10/2016 | Raghu | G05D 1/0088 |
| 9,511,767 | B1 | 12/2016 | Okumura et al. | |
| 2014/0277901 | A1 | 9/2014 | Ferguson et al. | |
| 2017/0039435 | A1 | 2/2017 | Ogale et al. | |
| 2018/0011496 | A1* | 1/2018 | Fairfield | B60W 30/09 |

OTHER PUBLICATIONS

Kurup, U., Lebiere, C., Stentz, A., & Hebert, M. Predicting and Classifying Pedestrian Behavior Using an Integrated Cognitive Architecture. In Proceedings of the Behavior Representation in Modeling and Simulation (BRIMS-12) Conference, Amelia Island, FL, 2012, pp. 86-92.

Haring, K.S., Ragni, M., & Konieczny, L. A Cognitive Model of Drivers Attention. In Proceedings of ICCM, 2012, pp. 275-280.

Haring, K.S., Watanabe, K., Ragni, M., & Konieczny, L. The use of ACT-R to Develop an Attention Model for Simple Driving Tasks. In Proceedings of CogSci, 2012, pp. 432-437.

Fastenmeier, W. & Gstalter, H. Driving Task Analysis as a Tool in Traffic Safety Research and Practice. Safety Science, vol. 45, pp. 952-979, 2007.

Lebiere, C. The dynamics of cognition: An ACTR model of cognitive arithmetic. Kognitionswissenschaft, 8, pp. 5-19, 1999.

Anderson, J.R. et al. An Integrated Theory of the Mind. Psychological Review, 111(4): pp. 1036-1060, 2004.

Stewart, T.C. & West, R.L. Deconstructing ACT-R. Proceedings of the Seventh International Conference on Cognitive Modeling, 2006, pp. 1-6.

International Preliminary Report on Patentability for PCT/US2018/026479; dated Mar. 25, 2019.

Notification of Transmittal of International Search Report and the Written Opinion of the International Searching Authority for PCT/US2018/026479; dated Aug. 30, 2018.

International Search Report of the International Searching Authority for PCT/US2018/026479; dated Aug. 30, 2018.

Written Opinion of the International Searching Authority for PCT/US2018/026479; dated Aug. 30, 2018.

* cited by examiner

COGNITIVE BEHAVIOR PREDICTION SYSTEM FOR AUTONOMOUS SYSTEMS

CROSS-REFERENCE TO RELATED APPLICATIONS

This is a Non-Provisional patent application of U.S. Provisional Application No. 62/484,489, filed in the United States on Apr. 12, 2017, entitled, "Cognitive Behavior Prediction System for Autonomous Systems" the entirety of which are hereby incorporated by reference.

BACKGROUND OF INVENTION

(1) Field of Invention

The present invention relates to a system for cognitive behavior prediction and, more particularly, to a system for cognitive behavior prediction for autonomous systems using their taxonomic states.

(2) Description of Related Art

Adaptive Control of Thoughts-Rational (ACT-R) is a computational cognitive architecture that implements a unified theory of cognition. ACT-R includes a number of models operating in parallel, including long-term declarative memory, and perceptual and motor modules for a number of modality channels. Those modules interact through limited-capacity buffers that can trigger operations such as memory retrieval, perceptual shifts and encoding, and motor movements, and in turn hold the result of those operations, such as retrieved memory chunks and encoding perceptual objects.

Salvucci developed a driver model in ACT-R for steering profiles, lateral position profiles, and gaze distributions of human drivers during lane keeping, curve negotiation, and lane changing (see the List of Incorporated Literature References, Literature Reference No. 1). Although this model is the first integrated cognitive model of human driving behavior in ACT-R, the model is highly limited to highway environment without recognition of traffic signs or crossing roads, and hasn't been used to predict driver behavior. Kurup et al. have used the ACT-R cognitive architecture to predict agent behavior, but only for pedestrians, and for the sole purpose of the identification of suspicious behavior (see Literature Reference No. 2).

Further, Haring et al. also built a computational model of human attention in a car driving task using ACT-R, and their model is capable of keeping a traffic lane, overtaking another vehicle by lane change, and identifying traffic signs and situations at crossroads (see Literature Reference Nos. 3 and 4). Regarding traffic taxonomic states, Fastenmeier and Gstalter proposed traffic taxonomy for longitudinal driving (see Literature Reference No. 5), but their work does not extend the taxonomy for situations of making turns.

Thus, a continuing need exists for a system that utilizes ACT-R to predict the taxonomic states of agents on a scene and use them to make a vehicle operation decision, including making turns and other automated vehicular operations.

SUMMARY OF INVENTION

The present invention relates to a system for cognitive behavior prediction and, more particularly, to a system for cognitive behavior prediction for autonomous systems using their taxonomic states. The system comprises one or more processors and a non-transitory computer-readable medium having executable instructions encoded thereon such that when executed, the one or more processors perform multiple operations. The system uses a cognitive architecture to identify a taxonomic state of a motion condition of an autonomous vehicle based on a spatiotemporal location of the autonomous vehicle and a plurality of elements of a driving scenario. Behavior of the autonomous vehicle is predicted based on the taxonomic state of the motion condition. The system makes a driving operation decision based on the predicted behavior, and using the autonomous vehicle, implementing the driving operation decision.

In another aspect, the plurality of elements of the driving scenario comprises at least one of a vehicle, a traffic sign, a traffic signal, and a pedestrian.

In another aspect, the autonomous vehicle uses a generated behavior trace to make the driving operation decision.

In another aspect, the taxonomic state of the autonomous vehicle is identified using an Adaptive Control of Thought-Rational (ACT-R) cognitive architecture.

In another aspect, behavior of the autonomous vehicle is predicted using positional information of the autonomous vehicle and the plurality of elements of the driving scenario, and at least one of a velocity, a relative distance, and an angular location of the autonomous vehicle relative to the plurality of elements.

In another aspect, the ACT-R cognitive architecture is trained on driving data for which taxonomic states are known.

In another aspect, the ACT-R cognitive architecture comprises a driving operation intention for the autonomous vehicle, a plurality of rule sets each corresponding to the driving operation intention, and taxonomic states of the plurality of elements of the driving scenario.

In another aspect, the implemented driving operation is a turn.

In another aspect, blended recall is utilized to retrieve a matching taxonomic state.

In another aspect, the plurality of rule sets specifies a set of actions, wherein the set of actions is at least one of generating a trace message, scheduling the driving operation decision, and changing the taxonomic state of the motion condition.

In another aspect, the system tests the taxonomic state of the motion condition; selects a rule set that matches the driving scenario, wherein the rule set is selected using a combination of symbolic matching and statistical optimization; and triggers the driving operation decision.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
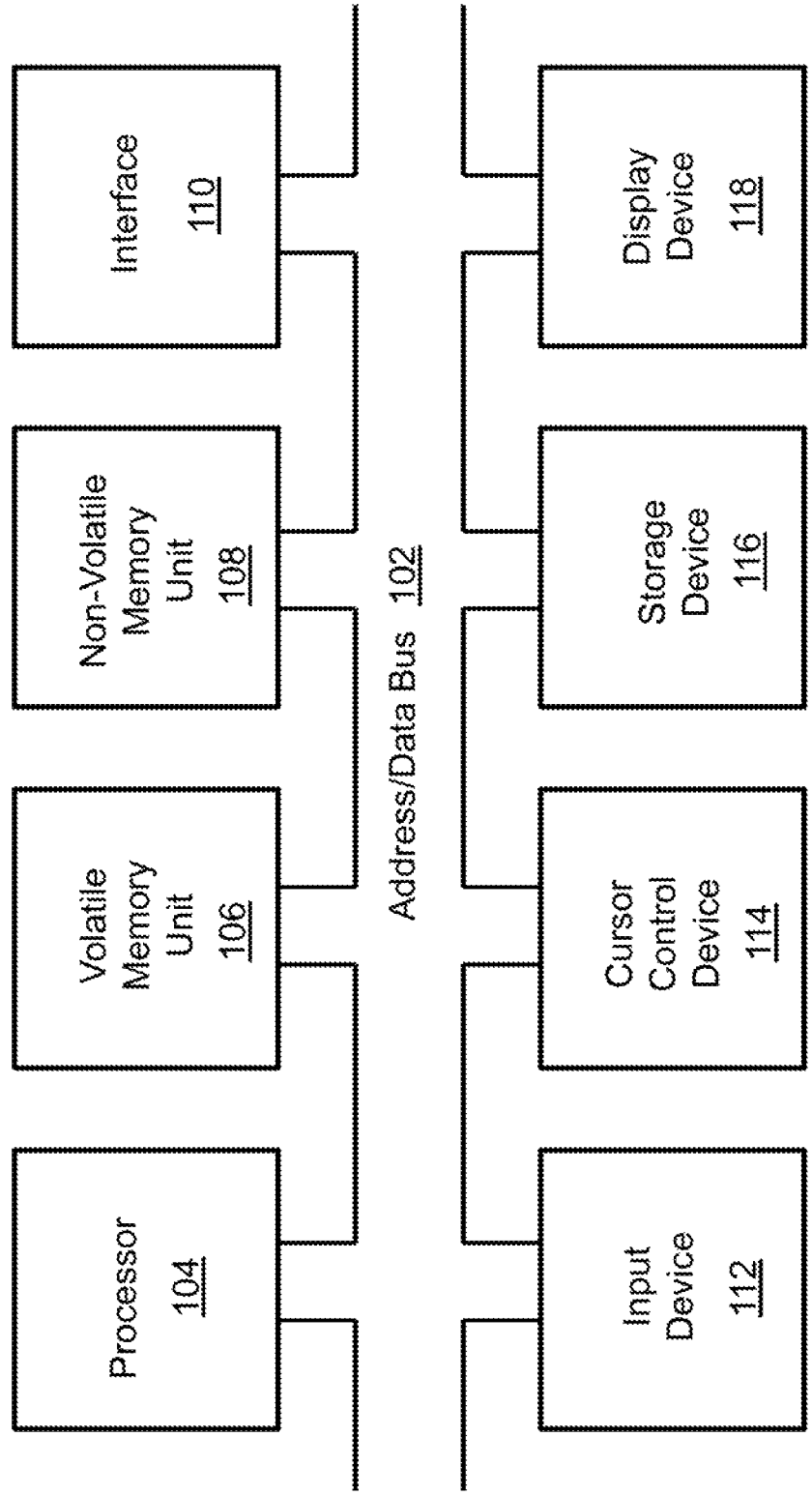
FIG. 1 is a block diagram depicting the components of a system for cognitive behavior prediction according to some embodiments of the present disclosure.

The present invention relates to a system for cognitive behavior prediction and, more particularly, to a system for cognitive behavior prediction for autonomous systems using their taxonomic states. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) List of Incorporated Literature References

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number, as follows:

1. Salvucci, D. D. Modeling Driver Behavior in a Cognitive Architecture. Human Factors, Vol. 48 No. 2, pp. 362-380, 2006.
2. Kurup, U., Lebiere, C., Stentz, A., & Hebert, M. Predicting and Classifying Pedestrian Behavior Using an Integrated Cognitive Architecture. In Proceedings of the Behavior Representation in Modeling and Simulation (BRIMS-12) Conference, Amelia Island, Fla., 2012.
3. Haring, K. S., Ragni, M., & Konieczny, L. A Cognitive Model of Drivers Attention. In Proceedings of ICCM, 2012.
4. Haring, K. S., Watanabe, K., Ragni, M., & Konieczny, L. The use of ACT-R to Develop an Attention Model for Simple Driving Tasks. In Proceedings of CogSci, 2012.
5. Fastenmeier, W. & Gstalter, H. Driving Task Analysis as a Tool in Traffic Safety Research and Practice. Safety Science, Vol. 45, pp. 952-979, 2007.
6. Lebiere, C. The dynamics of cognition: An ACTR model of cognitive arithmetic. Kognitionswissenschaft, 8, 5-19, 1999.
7. Anderson, J. R. et al. An Integrated Theory of the Mind. Psychological Review, 111(4): 1036-60, 2004.
8. Stewart, T. C. & West, R. L. Deconstructing ACT-R. Proceedings of the Seventh International Conference on Cognitive Modeling, 2006.

(2) Principal Aspects

Various embodiments of the invention include three "principal" aspects. The first is a system for cognitive behavior prediction. The system is typically in the form of a computer system operating software or in the form of a "hard-coded" instruction set. This system may be incorporated into a wide variety of devices that provide different functionalities, such as be incorporated into an autonomous vehicle. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
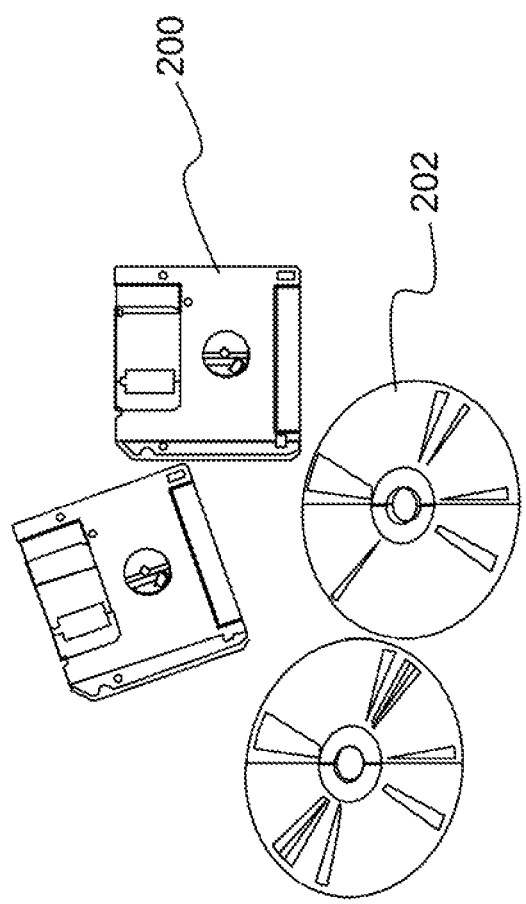
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Specific Details of Various Embodiments

Described is a system and method that utilizes a cognitive architecture to predict agent behavior by identifying their taxonomic states such that the agents/autonomous systems make appropriate and safe go/no-go decisions. In this context, agents include all identifiable objects on the scene, such as vehicular systems, traffic signs/signals, and pedestrians. By utilizing an Adaptive Control of Thoughts-Rational (ACT-R) cognitive architecture, the system according to embodiments of the present disclosure introduces a system with two modules. The first module, based on supervised learning, identifies taxonomic states (e.g., approaching intersection, proceeding, stopping due to a traffic sign, stopping due to oncoming traffic, yielding, turning for motor vehicles, etc.) using instance-based learning leveraging ACT-R's partial matching and blending functionalities with high accuracy. The training data is not an exact match of the testing data, which is the common condition in vehicular systems. For instance, cars and airplanes that turn left have different characteristics due to people's unique driving habits and vehicular/aerial settings. The second module applies the first module to each identified agent on the scene in order to predict their taxonomic states such that an autonomous vehicle makes a safe go/no-go decision. Each of these aspects will be described in further detail below.

(3.1) Adaptive Control of Thoughts-Rational (ACT-R)

ACT-R is a computational cognitive architecture that implements a unified theory of cognition (see Literature Reference No. 8). ACT-R includes a number of models operating in parallel, including long-term declarative memory, and perceptual and motor modules for a number of modality channels. Those modules interact through limited-capacity buffers that can trigger operations, such as memory retrieval, perceptual shifts and encoding, and motor movements, and, in turn, hold the result of those operations, such as retrieved memory chunks and encoding perceptual objects.

Figure 8:
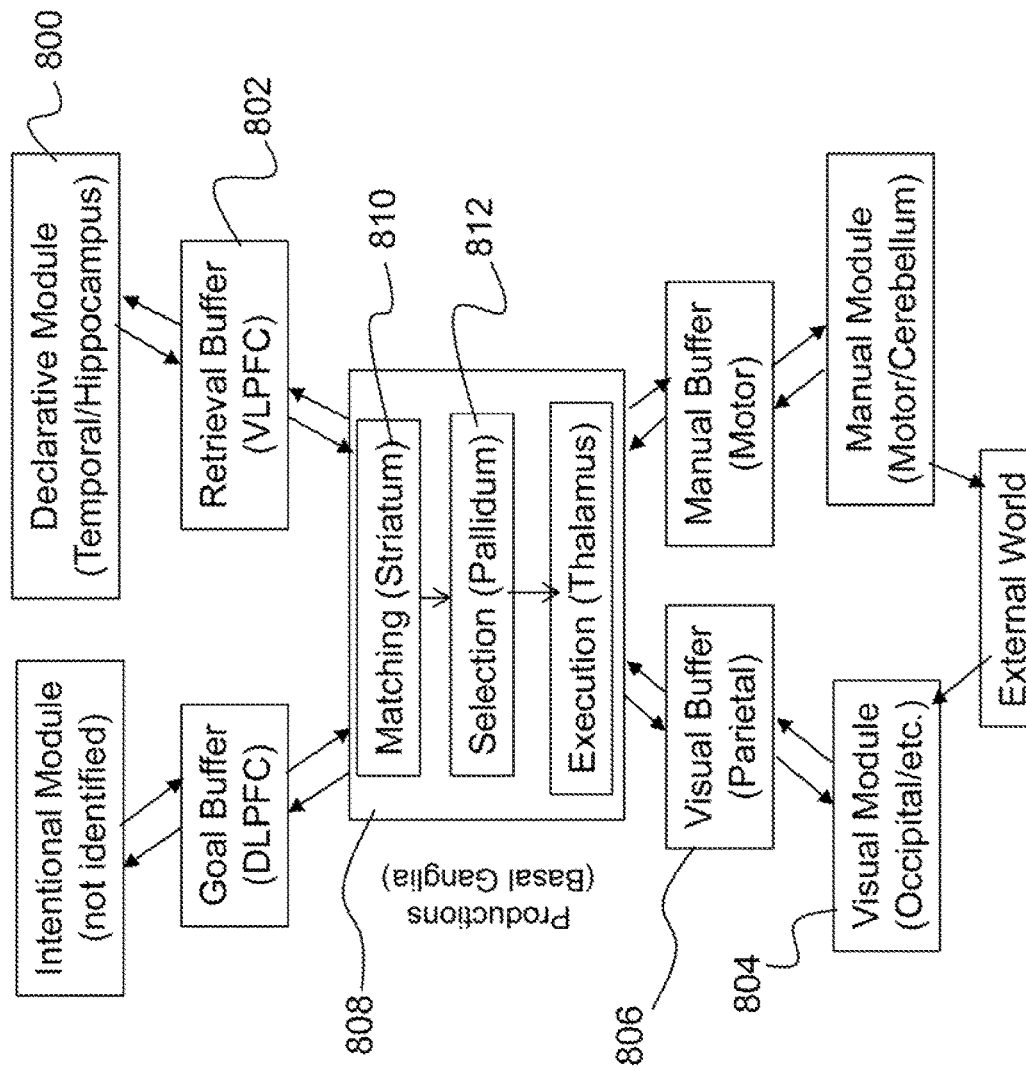
FIG. 8 is a flow diagram illustrating organization of information in the ACT-R architecture according to prior art.

FIG. 8 is a prior art flow diagram depicting organization of information in the ACT-R architecture according to Literature Reference No. 7, which is incorporated by reference as though fully set forth herein. Information in the buffers associated with modules is responded to and changed by production rules. Of significance to the embodiments described herein are the Declarative Module 800 and the Retrieval Buffer 802, collectively referred to as Module 1 herein (described in section (3.2)). Module 1 (Declaration Module 800 and Retrieval Buffer 802) are used for storage and retrieval of the memory chunks that associate taxonomic state with relevant positional information. Referring to FIG. 8, relevant positional information of the autonomous system or an object near the autonomous system would come in through the Visual Module 804 and the Visual Buffer 806.

Synchronizing those modules is a procedural module 808 consisting of production-action rules that test the state of the various buffers, select the rule best matching the situation, and trigger the actions in various modules through the corresponding buffers. Rule selection and fact retrieval uses a combination of symbolic matching and statistical optimization. Specifically, memory chunks are retrieved from long-term declarative memory according to processes that maximize the total memory segment (chunk) activation, combining mechanisms such as partial matching that perform an approximate match to the pattern provided, and a blending mechanism that combines multiple memory chunks according to their degree of match to yield a consensus judgment. In an example described below, a description of making a left turn for ground vehicular systems is provided. However, as can be appreciated by one skilled in the art, other maneuvers and other embodiments in other agents and their agent behaviors and maneuvers are also possible.

The processes which mediate the memory/fact retrieval (the highest activated/winning memory segment) are mechanisms, such as partial matching that perform an approximate match to the pattern provided, and a blending mechanism that combines multiple chunks according to their degree of match to yield a consensus judgment. The partial match, as described above, can pertain to symbolic quantities. Since the probability of retrieving the chunks in the memory that perfectly matches the incoming production conditions is low, the partial matching mode in ACT-R computes a match score based on the similarity between the desired conditions and the actual conditions. Additional details can be found in Literature Reference No. 6.

Blending refers to a statistical procedure where multiple activated memory segments are combined according to the strength of their activation to produce a new memory segment (the retrieved one, which is output as the recall, also described above as the highest activated/winning memory segment) (see Literature Reference No. 6). The new memory segment/chunk is, in essence, a weighted sum of the multiple activated chunks according to the level of their activation (weighted sum).

Also related to chunk activation are other "statistics", such as recency (how recently this chunk activated). For example, the activation curve may follow an exponential decay based on the number of time steps in the architecture since it was last activated (see the trace from the program from "0.000 GOAL" to "0.050 PROCEDURAL" in FIGS. 6A and 6B). Frequency refers to a statistic related to how often (over some period) a chunk was activated.

Rule selection and fact retrieval are separate processes. Fact retrieval occurs in Module 1 (see section (3.2)), and occurs through the blended recall mechanism (which can be considered statistical). Though not included in the disclosed embodiment, other variants of retrieval mechanisms that can take into account symbolic matching in Module 1 declarative memory include exact matching and partial matching, and are also in scope if input cues (such as positional information) were to include symbolic information instead of just sub-symbolic (numerical).

Rule selection occurs in Module 2 (see section (3.3)), which can be considered to take place in the matching module 810 and the selection module 812 of FIG. 8. This involves symbolic matching of goals (which include environmental information as features in addition to other information) and taxonomic states for the rule antecedent. Statistical learning mechanism's, such as reinforcement learning mechanisms, can handle conflict resolution when multiple rules match the antecedent (goal, taxonomic state).

(3.2) Module 1: Taxonomic State Prediction (Elements 800 and 802)

ACT-R accomplishes the prediction of taxonomic state by taking into account the positional information of each agent in the scene, including velocity, relative distance, and angular location relative to other agents, for example using LIDAR (Light Detection and Ranging), radar, accelerometer, gyroscope, etc. The system described herein is first trained in a supervised manner on driving data for which taxonomic states are known. A non-limiting example of driving data includes a set of the following tuples: (time, agent_1_position, agent_1_speed, agent_2_position, agent_2_speed, . . . , taxonomic_state), where all fields except time are relative to some agent in the scenery. Direction of the vehicle is accounted for by knowing a velocity vector for the vehicle. It is then tested on unknown driving data in which the positional information is used to classify taxonomic state.

During the training phase, ACT-R chunks/memory segments are formed that encode the relevant positional information (e.g., velocity, distance, angle) and its association with a taxonomic state. For example, given a 4-way intersection with a stop sign (Agent S), one reference vehicle (Agent A) and two other vehicles (Agents B and C) on the scene, the generic ACT-R Model M computes the taxonomic state of Agent A as follows. Model M computes if Agent A is approaching intersection based on the physical properties involved in approaching the intersection (e.g., distance to Agent S is bounded) using the physical proximity (i.e., distance, angle) and speed/velocity relative to Agent S. In this case, Model M labels the input data point's taxonomic state as "approaching intersection". Model M computes if Agent A is stopping due to traffic sign based on the physical properties involved in stopping due to traffic sign (e.g., decelerates when approaching intersection with Agent S in vicinity) using the physical proximity and speed relative to Agent S. In this case, Model M labels the input data point's taxonomic state as "stopping due to traffic sign".

Model M computes if Agent A is stopping due to oncoming traffic on the scene based on the physical properties involved in stopping due to oncoming traffic (e.g., Agent A's speed is low while Agents B and C's relative speeds and relative distance to Agent A are high and small, respectively) using the physical proximity and speed relative to Agent S. In this case, Model M labels the input data point's taxonomic state as "stopping due to oncoming traffic". Model M computes if Agent A is making a turn due to traffic sign based on the physical properties involved in turning (e.g., Agent A's changes in angle and speed relative to Agent S follows the physical properties involved in turning). In this case, Model M labels the input data point's taxonomic state as "turning".

Model M computes if Agent A is yielding based on the physical properties involved in yielding (e.g., Agent B or C is within close physical proximity to Agent A with some speed and has some probability to interfere with Agent A's anticipated route). In this case, Model M labels the input data point's taxonomic state as "yielding". Otherwise, Model M considers that Agent A is proceeding, and labels the input data point's taxonomic state as "proceeding".

During testing, the ACT-R model utilizes blended recall to retrieve the best matching taxonomic state. Blended recall/retrieval in ACT-R is a mechanism conceptually similar to K-nearest-neighbors which allows the model to produce activation-weighted intermediate values (in the case of continuous variables) or consensus values (in the case of discrete variables, such as taxonomic state). Blended recall/retrieval in ACT-R is described in Literature Reference No. 6. By leveraging past instances, the model quickly learns to accurately classify taxonomic state with a relatively small amount of training. The activation at the core of ACT-R's theory of memory dynamics also accounts for recency and frequency of encounter, which means that the model can quickly learn novel examples through a few repetitions.

(3.3) Module 2: Go/No-go Decision (Elements 810 and 812)

The ACT-R model for the Go/No-Go decisions consists of a single goal, called "drive", with multiple production rule sets each corresponding to a specific intention, including turning left, turning right, and driving straight (or other specific intentions as may be desired or programmed). That intention is stored in the "goal" slot of the model. A number of goal slots correspond to the taxonomic states of other agents, including: "Pedestrians", which contains the intention of nearby pedestrians to cross the street in front of the car as it approaches the intersection; "Crossing-intent", which contains the taxonomic state of the vehicle(s) approaching the intersection from a crossing direction; "Oncoming-intent", which contains the taxonomic state of the vehicle(s) approaching the intersection from the opposite direction; and "Following-intent", which contains the taxonomic state of the vehicle(s) that the own car is following through the intersection.

In addition, a number of goal slots (see FIGS. 6A and 6B and Literature Reference Nos. 6 and 8) encode a number of features of the environment, including: "Signal", the state or presence of the signal at the intersection that the car is approaching; "Oncoming-distance", the distance at which the oncoming cars are currently from the car; "Obstacle", the presence of any obstacle in the intersection, such as a wide bus or truck; and "Position", the position of the own agent (e.g., car) on the street, specifically which lane of the current roadway.

Finally, the "status" slot encodes the current taxonomic state of the own agent (e.g., vehicle). For each specific goal, a set of production rules encode the various conditions and associated actions as described in the taxonomy of Fastenmeier and Gstalter (see Literature Reference No. 5). Each production typically tests the current goal, a subset of the conditions for the taxonomic states of other agents, a subset of the environment conditions, and the current taxonomic state of the own agent. The production then specifies a set of actions, including generating a trace message, scheduling an external action such as stopping, turning or slowing down, and changing the current taxonomic state. A trace message may be used to inform/notify the decision of the system to other parties (e.g., humans behind each agent). One production is selected and executed at every point, and the cycle repeats after its actions have taken effect.

A non-limiting example of a goal is to recall a similar memory segment. The corresponding production rule would then be: when the goal is to recall a similar memory segment and when a memory segment exists in the buffer, blend it and compute the relative velocity of the system (e.g., car) to a reference object. Another example goal is to adjust the speed of the taxonomic state (e.g., autonomous vehicle). The corresponding production rule would then be: when the goal is to adjust the speed and the blending is done, adjust the speed and compute the taxonomic state.

(3.4) Experimental Studies

Figure 3:
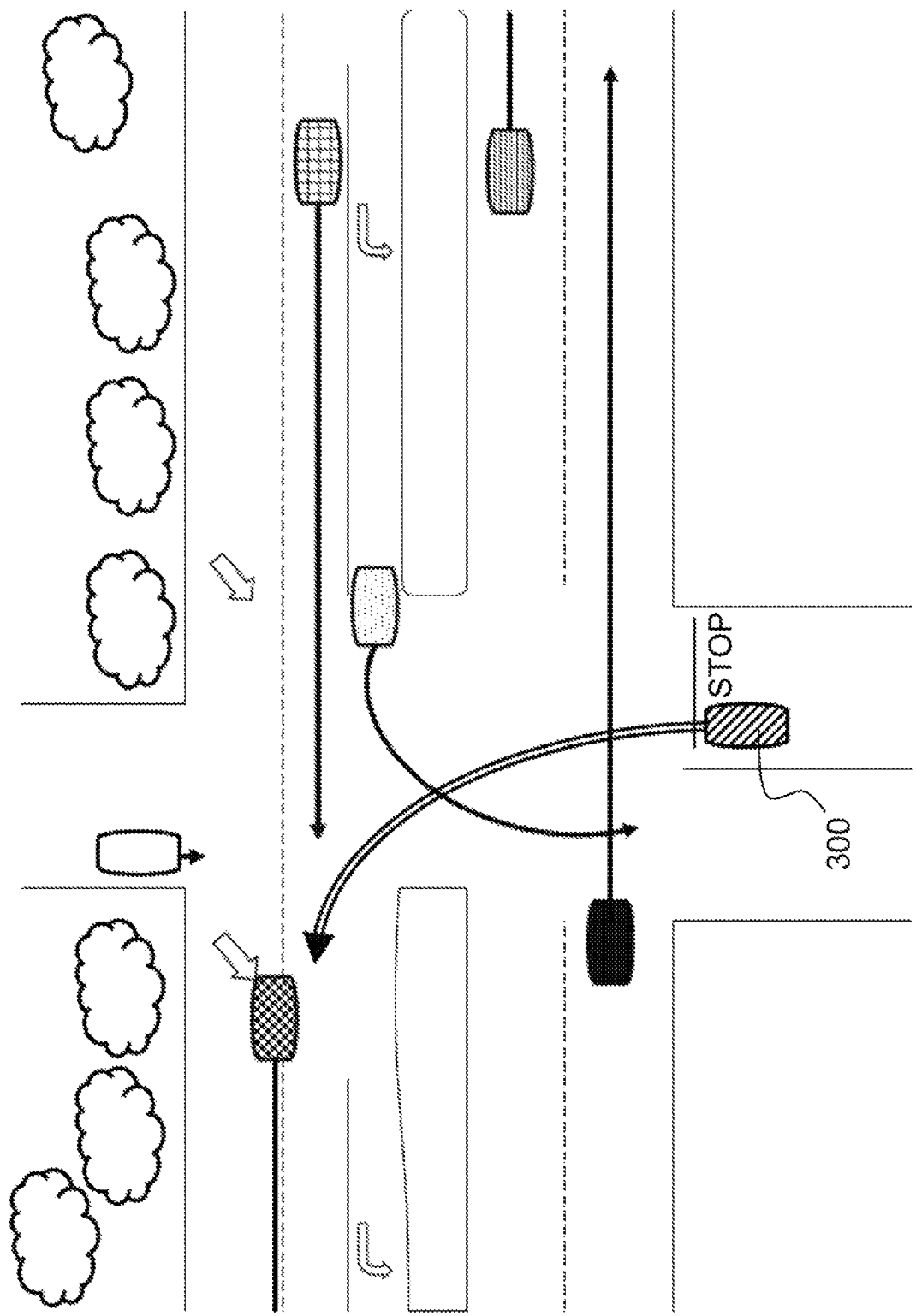
FIG. 3 is an illustration of a simulated driving scenario according to some embodiments of the present disclosure.
Figure 4:
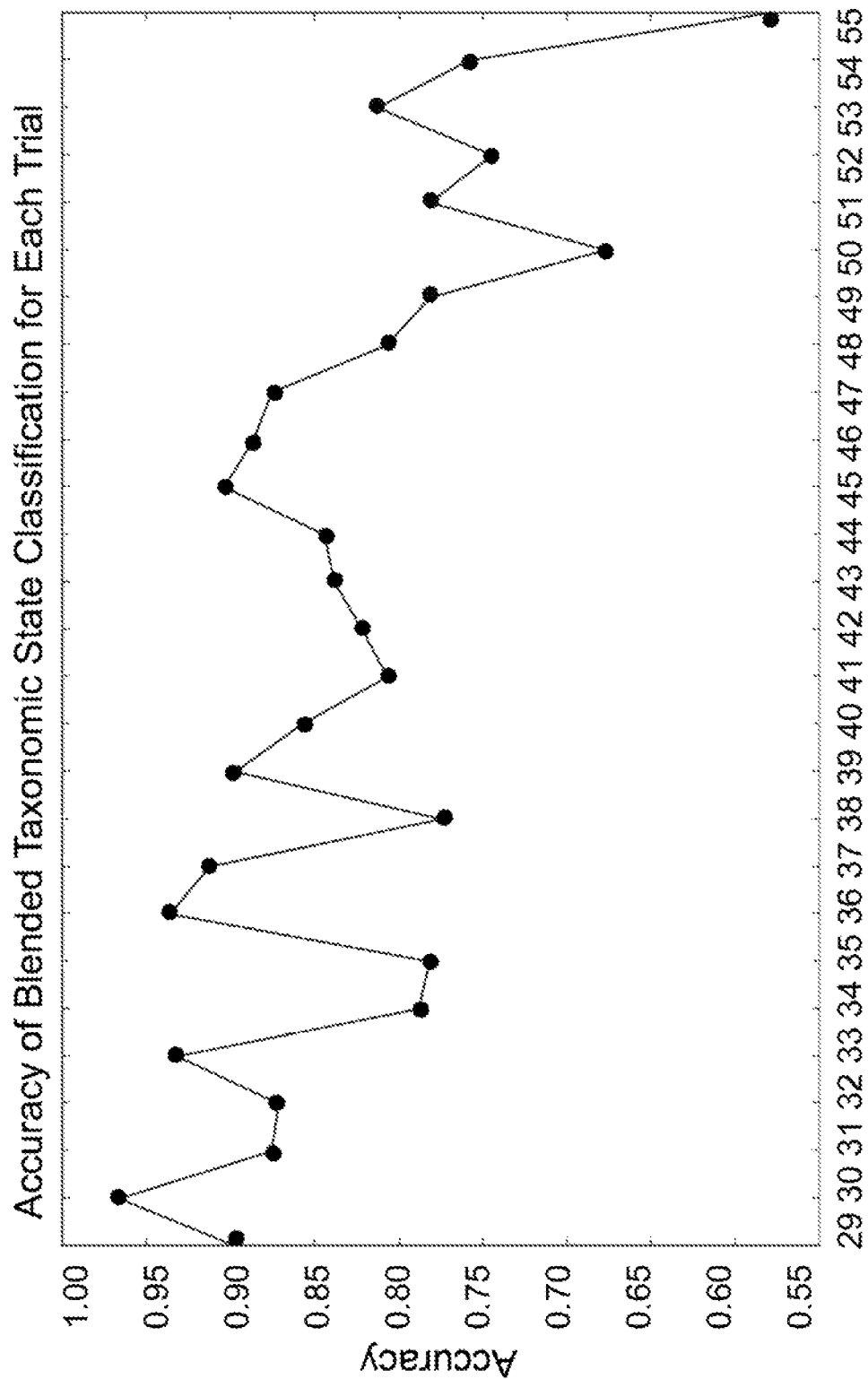
FIG. 4 is an illustration of the accuracy of the blended taxonomic states compared to ground truth across multiple trials according to some embodiments of the present disclosure.
Figure 5:
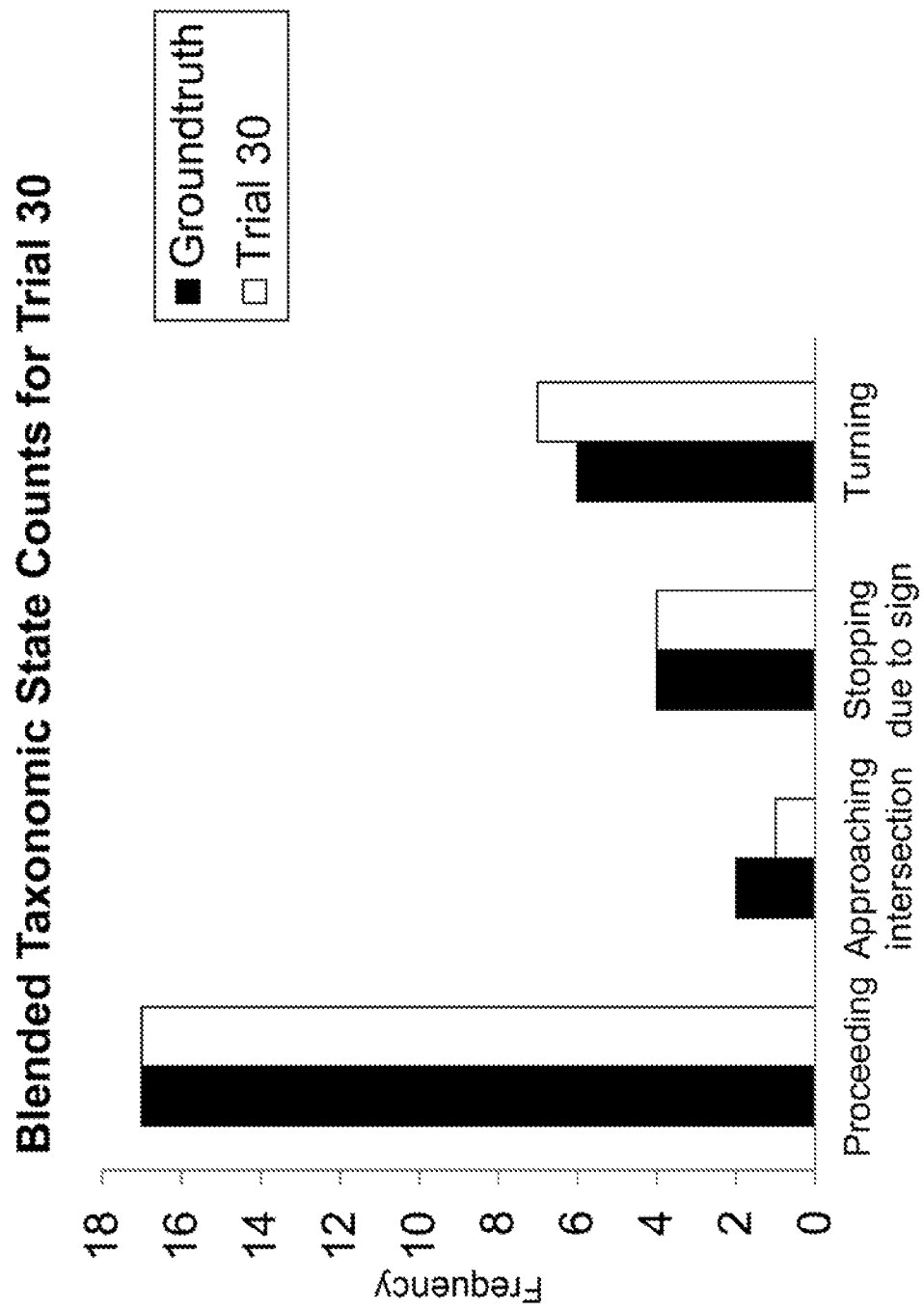
FIG. 5 is an illustration of aggregate taxonomic state across a single trial according to some embodiments of the present disclosure.

A preliminary experiment was conducted to show the accuracy and practicality of the system according to embodiments of the present disclosure. FIG. 3 shows the layout of the simulated driving scenario. Vehicle 300 is the autonomous vehicle turning left. In this embodiment, 25 simulated trials with agent behaviors in an autonomous vehicle were used for training data. 26 trials were utilized to test the performance of the system. FIG. 4 is a plot illustrating the accuracy of the blended taxonomic state from Module 1 (i.e., taxonomic state prediction) compared to the ground truth on the test trials. The average accuracy across trials was 82.94%. In this embodiment, different agents (e.g., vehicles, robots) traversed the scene producing different behaviors over the course of a single trial. FIG. 5 is a histogram illustrating the aggregate taxonomic state across a single trial. Specifically, accuracy of the ACT-R system's outcome compared to a known ground truth is shown. In FIG. 5, filled bars represent ground truth data, and unfilled bars represent Trial 30 (an instance of a driving trial).

Figure 6A:
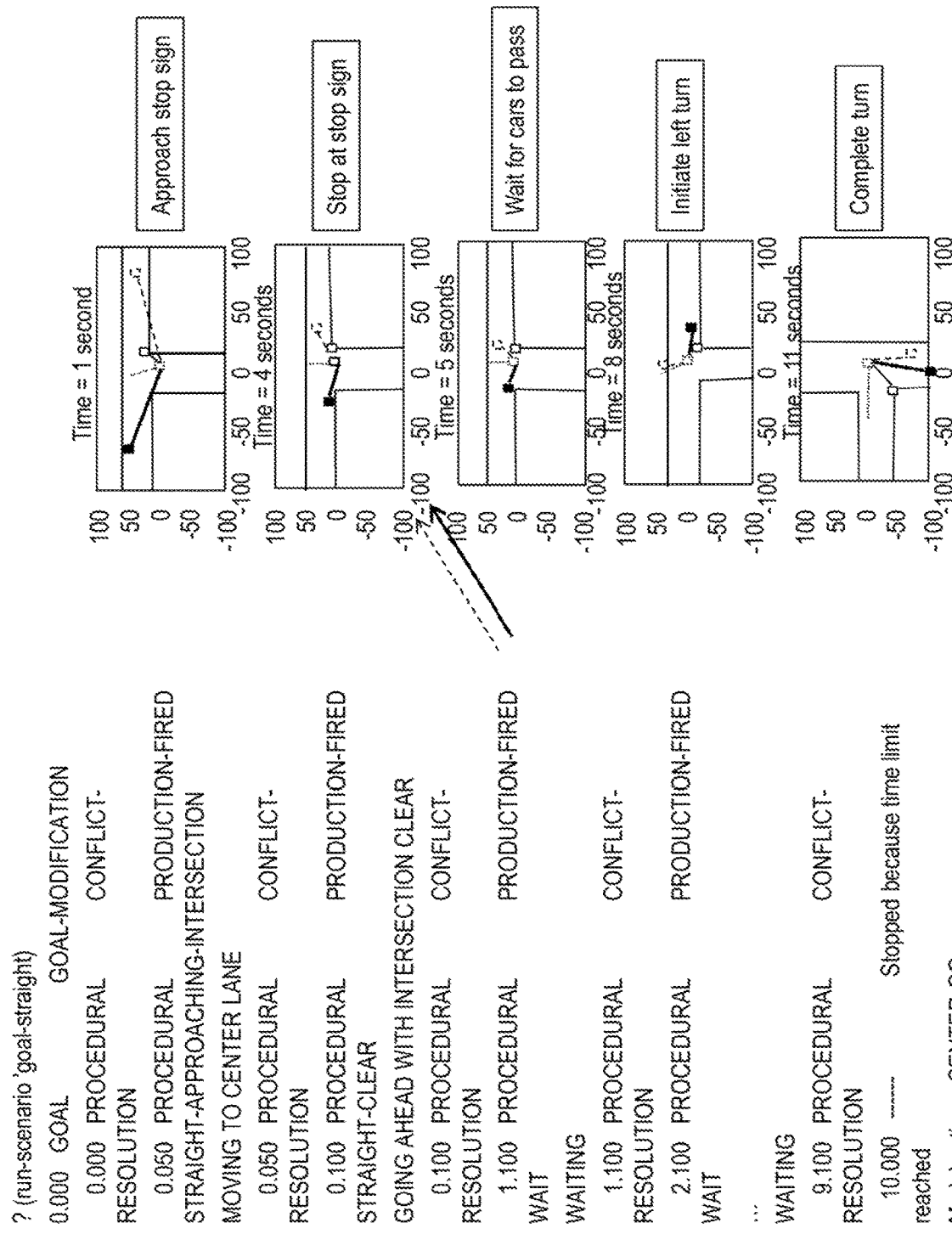
FIG. 6A is an illustration of behavior traces and taxonomic states for two of three agents in a driving scenario in a single trial according to some embodiments of the present disclosure.
Figure 6B:
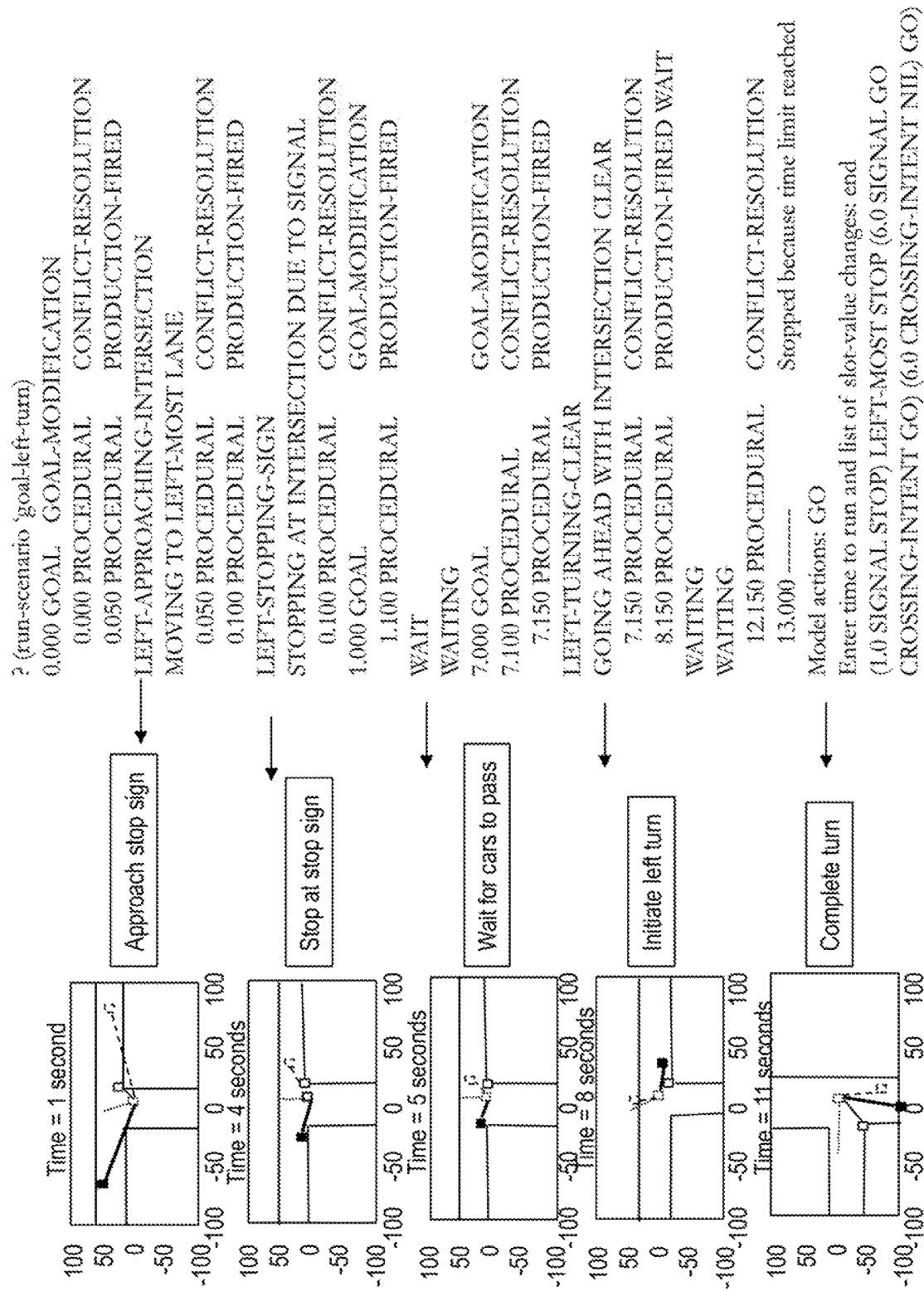
FIG. 6B is an illustration of behavior traces and taxonomic states for one of three agents in the driving scenario of FIG. 6A according to some embodiments of the present disclosure.

FIGS. 6A and 6B depict the outputs of Module 2 (i.e., Go/No-Go Decision) in this embodiment. The results are for a single trial and illustrate the behavior traces (e.g., approaching intersection, then stopping at intersection, then turning at intersection) for multiple agents in the scene. Detailed information from ACT-R shows the goals, operations of the procedural system, and resulting behavior predictions for agents.

Figure 7:
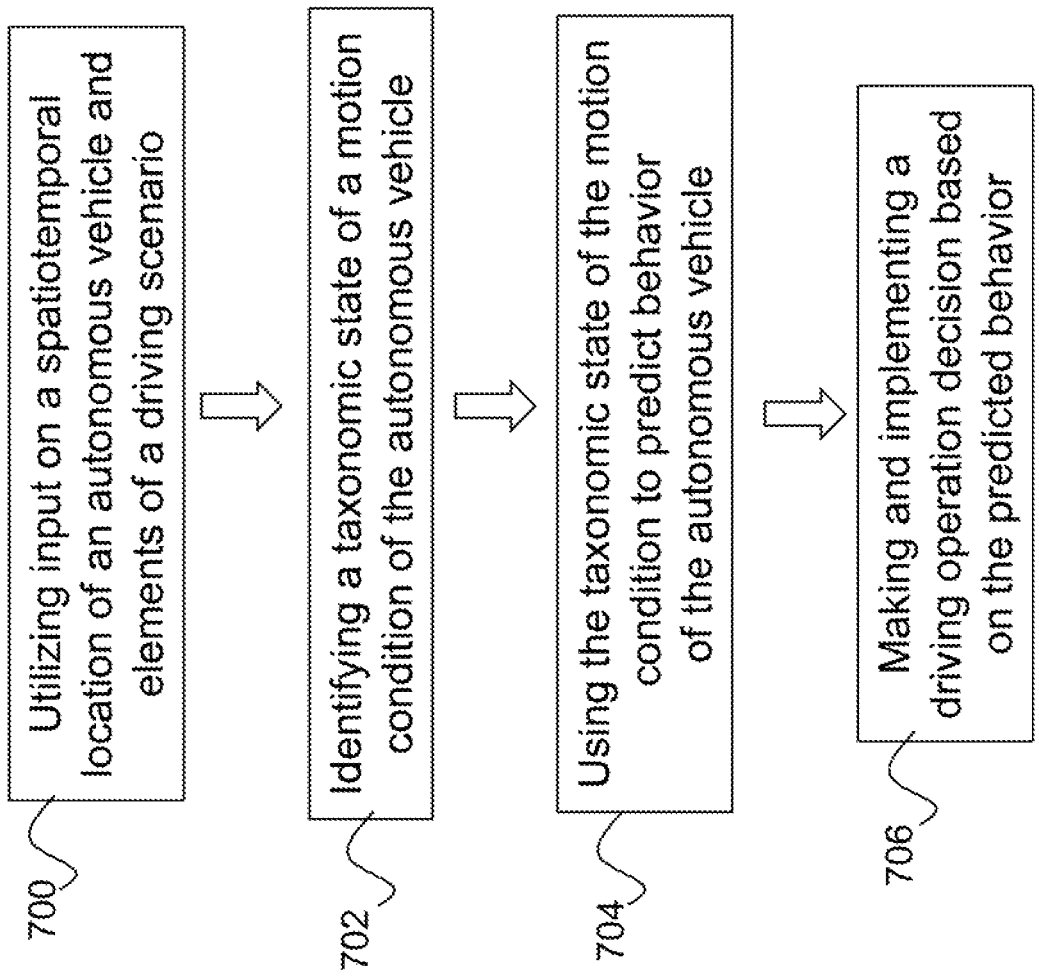
FIG. 7 is a flow diagram illustrating autonomous vehicle behavior prediction according to some embodiments of the present disclosure.

FIG. 7 is a flow diagram depicting the operations of the system described herein. As described above, the system utilizes input on a spatiotemporal location of an autonomous vehicle and multiple elements (traffic signs, pedestrians, other vehicles) of a driving scenario (element 700). A taxonomic state of a motion condition of the autonomous vehicle is identified (element 702). The taxonomic state of the motion condition is then used to predict behavior of the autonomous vehicle (element 704). Finally, the autonomous vehicle makes and implements a driving operation decision based on the predicted behavior (element 706).

The invention described herein can help autonomous systems make a safe decision when making physical changes in motion (e.g., an autonomous vehicle making a turn, an unmanned aerial vehicle (UAV) changing the flight direction, etc.) based on the predicted behavior of other agents on the scene while avoiding collision. The system can be incorporated as a tool into autonomous vehicular systems (e.g., autonomous vehicles, UAVs). Accurately predicting the behavior of other agents on the scene can not only ease the complexity involved in making the right choice to drive autonomous systems, but also guarantee the safety of people and vehicles on the scene.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for predicting autonomous vehicle behavior, the system comprising:
one or more processors and a non-transitory computer-readable medium having executable instructions encoded thereon such that when executed, the one or more processors perform operations of:
using a cognitive architecture, identifying a taxonomic state of a motion condition of an autonomous vehicle based on a spatiotemporal location of the autonomous vehicle and a plurality of elements of a driving scenario;
predicting behavior of the autonomous vehicle based on the taxonomic state of the motion condition;
making a driving operation decision based on the predicted behavior; and
using the autonomous vehicle, implementing the driving operation decision.

2. The system as set forth in claim 1, wherein the plurality of elements of the driving scenario comprises at least one of a vehicle, a traffic sign, a traffic signal, and a pedestrian.

3. The system as set forth in claim 1, wherein the autonomous vehicle uses a generated behavior trace to make the driving operation decision.

4. The system as set forth in claim 1, wherein the taxonomic state of the autonomous vehicle is identified using an Adaptive Control of Thought-Rational (ACT-R) cognitive architecture.

5. The system as set forth in claim 4, wherein the ACT-R cognitive architecture is trained on driving data for which taxonomic states are known.

6. The system as set forth in claim 4, wherein the ACT-R cognitive architecture comprises a driving operation intention for the autonomous vehicle, a plurality of rule sets each corresponding to the driving operation intention, and taxonomic states of the plurality of elements of the driving scenario.

7. The system as set forth in claim 6, wherein the plurality of rule sets specifies a set of actions, wherein the set of actions is at least one of generating a trace message, scheduling the driving operation decision, and changing the taxonomic state of the motion condition.

8. The system as set forth in claim 6, wherein the one or more processors further perform operations of:
testing the taxonomic state of the motion condition;
selecting a rule set that matches the driving scenario, wherein the rule set is selected using a combination of symbolic matching and statistical optimization; and
triggering the driving operation decision.

9. The system as set forth in claim 1, wherein behavior of the autonomous vehicle is predicted using positional information of the autonomous vehicle and the plurality of elements of the driving scenario, and at least one of a velocity, a relative distance, and an angular location of the autonomous vehicle relative to the plurality of elements.

10. The system as set forth in claim 1, wherein the implemented driving operation is a turn.

11. The system as set forth in claim 1, wherein the one or more processors further perform an operation of utilizing blended recall to retrieve a matching taxonomic state.

12. A computer implemented method for predicting autonomous vehicle behavior, the method comprising an act of:
causing one or more processors to execute instructions encoded on a non-transitory computer-readable medium, such that upon execution, the one or more processors perform operations of:
using a cognitive architecture, identifying a taxonomic state of a motion condition of an autonomous vehicle based on a spatiotemporal location of the autonomous vehicle and a plurality of elements of a driving scenario;
predicting behavior of the autonomous vehicle based on the taxonomic state of the motion condition;
making a driving operation decision based on the predicted behavior; and
using the autonomous vehicle, implementing the driving operation decision.

13. The method as set forth in claim 12, wherein the plurality of elements of the driving scenario comprises at least one of a vehicle, a traffic sign, a traffic signal, and a pedestrian.

14. The method as set forth in claim 12, wherein the autonomous vehicle uses a generated behavior trace to make the driving operation decision.

15. The method as set forth in claim 12, wherein the taxonomic state of the autonomous vehicle is identified using an Adaptive Control of Thought-Rational (ACT-R) cognitive architecture.

16. The method as set forth in claim 15, wherein the ACT-R cognitive architecture comprises a driving operation intention for the autonomous vehicle, a plurality of rule sets each corresponding to the driving operation intention, and taxonomic states of the plurality of elements of the driving scenario.

17. The method as set forth in claim 12, wherein behavior of the autonomous vehicle is predicted using positional information of the autonomous vehicle and the plurality of elements of the driving scenario, and at least one of a velocity, a relative distance, and an angular location of the autonomous vehicle relative to the plurality of elements.

18. A computer program product for predicting autonomous vehicle behavior, the computer program product comprising:
   computer-readable instructions stored on a non-transitory computer-readable medium that are executable by a computer having one or more processors for causing the processor to perform operations of:
   using a cognitive architecture, identifying a taxonomic state of a motion condition of an autonomous vehicle based on a spatiotemporal location of the autonomous vehicle and a plurality of elements of a driving scenario;
   predicting behavior of the autonomous vehicle based on the taxonomic state of the motion condition;
   making a driving operation decision based on the predicted behavior; and
   using the autonomous vehicle, implementing the driving operation decision.

19. The computer program product as set forth in claim 18, wherein the plurality of elements of the driving scenario comprises at least one of a vehicle, a traffic sign, a traffic signal, and a pedestrian.

20. The computer program product as set forth in claim 18, wherein the autonomous vehicle uses a generated behavior trace to make the driving operation decision.

21. The computer program product as set forth in claim 18, wherein the taxonomic state of the autonomous vehicle is identified using an Adaptive Control of Thought-Rational (ACT-R) cognitive architecture.

22. The computer program product as set forth in claim 21, wherein the ACT-R cognitive architecture comprises a driving operation intention for the autonomous vehicle, a plurality of rule sets each corresponding to the driving operation intention, and taxonomic states of the plurality of elements of the driving scenario.

23. The computer program product as set forth in claim 18, wherein behavior of the autonomous vehicle is predicted using positional information of the autonomous vehicle and the plurality of elements of the driving scenario, and at least one of a velocity, a relative distance, and an angular location of the autonomous vehicle relative to the plurality of elements.

* * * * *